United States Patent

[11] 3,608,663

| [72] | Inventor | Hugo S. Ferguson |
| | | Averill Park, N.Y. |
| [21] | Appl. No. | 30,158 |
| [22] | Filed | Apr. 20, 1970 |
| [45] | Patented | Sept. 28, 1971 |
| [73] | Assignee | Air Cushion Vehicles, Inc. |
| | | Poestenkill, N.Y. |
| | | Continuation-in-part of application Ser. No. |
| | | 2,810, Jan. 14, 1970. |

[54] AIR CUSHION VEHICLE WITH THRUST CONTROL
16 Claims, 8 Drawing Figs.

| [52] | U.S. Cl. | 180/120, 180/123 |
| [51] | Int. Cl. | B60v 1/14 |
| [50] | Field of Search | 180/120, 121, 122, 117; 115/15 |

[56] References Cited
UNITED STATES PATENTS

| 2,364,677 | 12/1944 | Warner | 180/120 UX |
| 3,243,003 | 3/1966 | Woltering | 180/120 |
| 3,292,721 | 12/1966 | Dobson | 180/120 |
| 3,467,213 | 9/1969 | Walker | 180/120 |
| 3,486,577 | 12/1969 | Jackes | 180/120 |
| 3,259,097 | 7/1966 | Van Veldhuizen et al. | 115/15 |
| 3,401,766 | 9/1968 | Laufman et al. | 180/119 |

*Primary Examiner*—A. Harry Levy
*Attorney*—Pennie, Edmonds, Morton, Taylor and Adams ABSTRACT: A single propeller mounted toward the front of the vehicle provides both propulsion and air cushion. Two-point steering is provided by front and rear steering vanes with air channels on each side which direct a portion of the downstream flow of air, under the control of the front vanes, to the rear vanes. To reduce forward thrust while maintaining effective steering control, sets of vanes are rotatably mounted in the air channels and controllable to block passage of air therethrough.

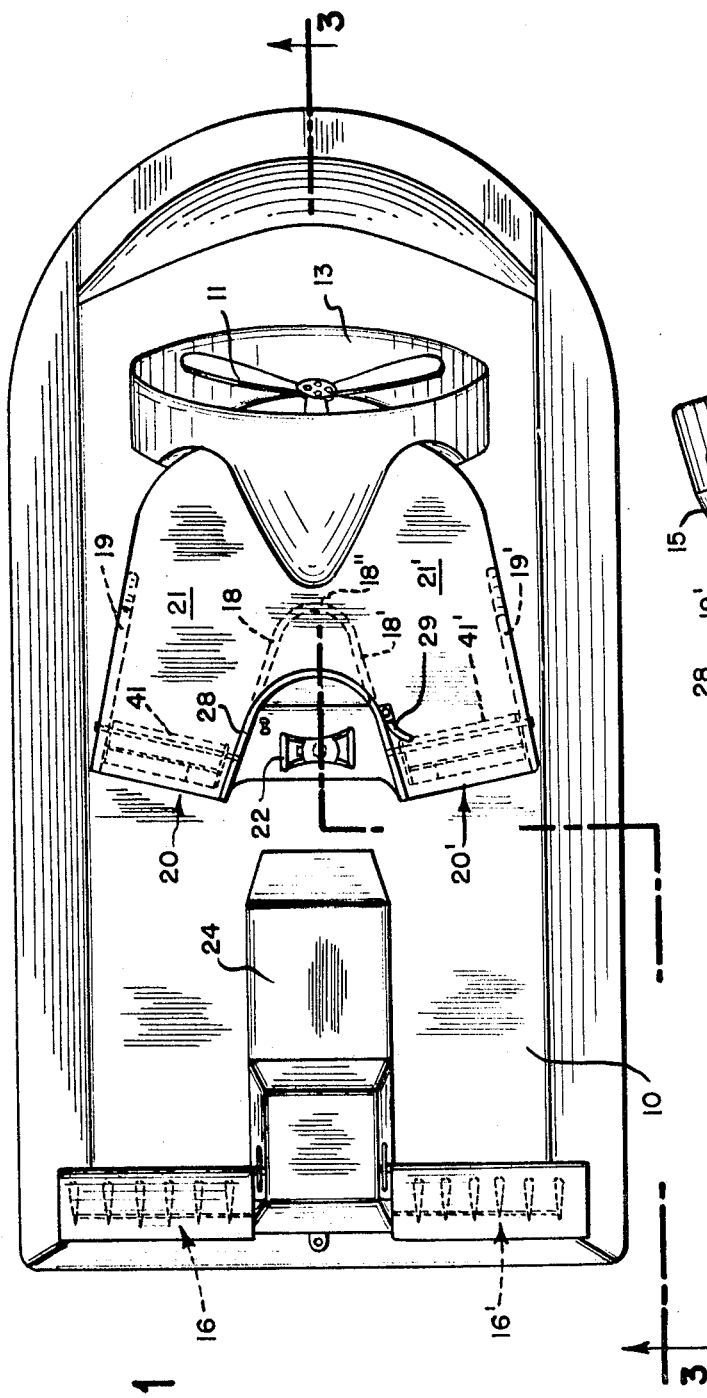
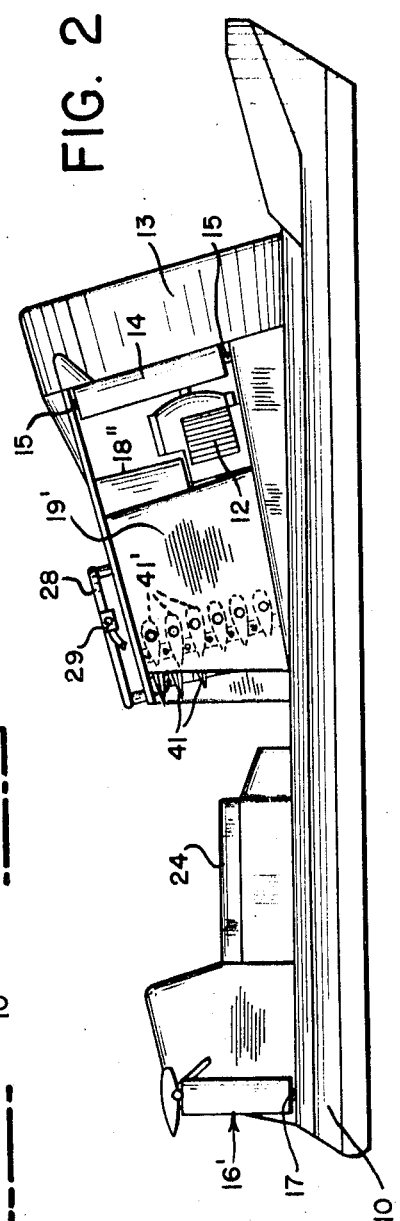
FIG. 1
FIG. 2
INVENTOR
Hugo S. Ferguson
BY
ATTORNEYS

PATENTED SEP 28 1971 3,608,663

INVENTOR
Hugo S. Ferguson
BY
ATTORNEYS

INVENTOR
Hugo S. Ferguson
ATTORNEYS 3,608,663

AIR CUSHION VEHICLE WITH THRUST CONTROL

RELATED APPLICATION This application is a continuation-in-part of application Ser. No. 2,810 filed Jan. 14, 1970 for "Air Cushion Vehicles."

BACKGROUND OF THE INVENTION

This invention relates to air cushion vehicles, and particularly to means for controlling the thrust of such vehicles.

In application Ser. No. 2,810, a vehicle is described in which a common source of air is employed for both the air cushion and propulsion. Two-point steering is provided by front and rear steering vanes with air channels on each side of the vehicle which direct a portion of the downstream flow of air, under the control of the front vanes, to the rear vanes. Joint control of front and rear vanes may be provided, with means for changing the relative vane angles to counter crosswinds and side slopes on hills. The vehicle described is highly maneuverable and capable of excellent performance, and yet is not unduly expensive.

In the vehicle, as specifically described in the aforementioned application, it is desirable to employ full power, or close to full power, whenever the vehicle is moving. This is to supply sufficient air underneath the vehicle to raise it off the supporting surface. In the vehicle specifically described, the design height is 1½ to 2 inches off the supporting surface under normal operating conditions. If, on the other hand, only a fraction of full power is used either in starting or stopping, the reduced air cushion may allow the vehicle to drag along the supporting surface. If the vehicle is operating on water, this may not be particularly troublesome. However, on land it may result in abrasion of the sidewalls and possibly damage from rocks, etc.

With full power applied, the vehicle accelerates quite rapidly. To stop quickly, it is necessary to turn the vehicle around until movement has ceased and then cut off the power. To an experienced driver, these movements are not difficult and may be quite exhilarating. However, a novice or a more cautious driver may be disturbed by the rapid acceleration in starting, and the need to turn around to stop, particularly when traveling downhill at high speed. Thus, it is desirable to provide means for controlling the forward propulsion thrust without reducing the air cushion.

In application Ser. No. 30,160 filed Apr. 20, 1970 by Hugo S. Ferguson for "Air Cushion Vehicle with Reverse Thrust Brakes," a vehicle is described in which collapsible brakes are provided at the outer walls of the air channels. In normal operation, with the brakes collapsed, operation is substantially the same as above described. However, with the brakes extended, a portion of the air normally passing through the air channels is diverted sidewise and forward so as to at least partially counteract the forward thrust. Thus, in starting with full power and the brakes applied, the full air cushion may be built up without forward movememt of the vehicle, or at least with only a slow forward movement. To stop, with full power applied, the airbrakes may be applied and the vehicle allowed to come to a halt before cutting off power. However, to stop quickly, or to stop while going downhill, it may still be necessary to turn the vehicle around so as to apply a counteracting force in the opposite direction until the vehicle stops. Unfortunately, the application of the airbrakes reduces the effectiveness of the front steering. This is due partly to turbulence and partly to the fact that the front steering vanes must be turned at a much wider angle in order to produce steering forces outside the extended airbrakes. The reduced effectiveness of the steering may be disquieting to the operator, and may make it difficult to control the vehicle if the brakes are applied when traveling at high speed.

The present invention is directed to means for reducing the forward thrust without impairing the front steering of the vehicle so that adequate control is possible at all times.

SUMMARY OF THE INVENTION

In accordance with the invention, air-blocking means are provided in the path of the downstream flow of air through the air-channeling means to the rear steering means for substantially blocking passage of air thereby. Advantageously the air-blocking means are mounted in the air channels.

In the specific embodiment described hereinafter, a set of rotatable vanes is mounted in each air channel which may be turned from fully open to fully closed positions at the will of the operator. Preferably the vanes are arranged to rotate about approximately horizontal axes extending laterally across the respective channel. In the fully open position, with streamlined vanes, the vanes have little if any effect on the operation of the vehicle. With the vanes turned to block the air channels, airflow therethrough is substantially cut off. This markedly reduces the forward thrust of the vehicle, even though full power is employed.

The cutting off of airflow through the channels renders the rear steering vanes ineffective. However, the front steering vanes remain fully effective and, indeed, their turning effectiveness may be increased. Thus the operator retains full control of the vehicle. Further, it has been found in practice that, with the air channels fully blocked, there is a noticeable increase in the cushion pressure under the front of the vehicle which lifts the front of the vehicle somewhat above its normal height from the supporting surface. Thus, there is no tendency for the vehicle to plow into the supporting surface when the air-blocking vanes are applied.

The air-blocking vanes may also be turned to an intermediate position wherein the air channels are only partially blocked. This enables the operator to reduce the forward thrust as desired. In such case a portion of the downstream flow of air will reach the rear steering vanes so that there will be some steering control at the rear of the vehicle, together with full steering control at the front. Consequently maneuverability is retained.

While the invention is particularly useful with vehicles in which a single propeller or set of propellers provide both air cushion and propulsion, it may be used to advantage in vehicles having a separate source of air for the air cushion. Although in such vehicles the propulsion power can be reduced without reducing the air cushion, the reduced power may result in partial or complete loss of steering control Additional advantages will be developed as the description proceeds.

BRIEF DESCRIPTION OF THE DRAWINGS

FIGS. 1 and 2 are plan and side views of an air cushion vehicle incorporating the air-blocking vanes of the invention:

DESCRIPTION OF THE SPECIFIC EMBODIMENT

Figure 3:
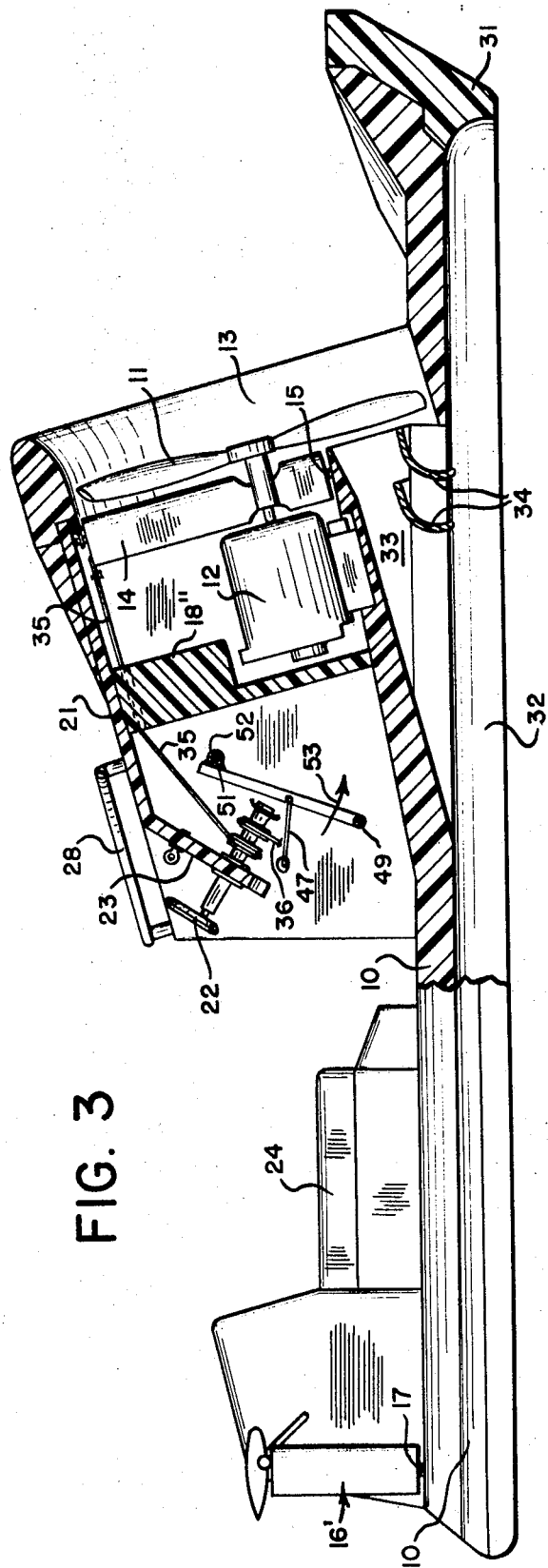
FIG. 3 is a cross section along the line 3—3 of FIG. 1.

Referring to FIGS. 1–3, an air cushion vehicle is shown of the type described in detail in application Ser. No. 2,810, supra. a body platform 10 has mounted thereon an air propeller 11 driven by motor 12. A shroud 13 around the propeller forms which short duct which improves the propeller efficiency.

Immediately behind the propeller is a set of upwardly extending front steering vanes 14 mounted for rotation about upwardly extending axes 15 so that, by turning the vanes in either direction, the downstream flow of air from the propeller is directed to lateral angles on either side of the vehicle. Sets of upwardly extending rear steering vanes 16, 16' are positioned near the rear of the vehicle on each side thereof, and are mounted for rotation about upwardly extending axes 17.

Air channel means is mounted on the body platform 10 between the front and rear steering vanes. An inner member has upwardly and rearwardly extending laterally spaced walls 18, 18' which are joined at the front thereof, as indicated at 18". The upper portion of the front end or nose 18" is rounded to promote a smooth flow of air. The lower portion may be flat to provide room for engine 12.

Upwardly and rearwardly extending outer walls 19, 19' are laterally spaced from respective inner walls 18, 18' to form respective open-ended laterally spaced air channels 20, 20' which receive respective portions of the downstream flow of air from the propeller, under the control of the front steering vanes 14, and direct the flow of air therethrough to respective sets 16, 16' of rear steering vanes. The channels are provided with top members 21, 21' which extend to the upper part of shroud 13 over the propeller, thereby preventing rearward flow of air from the propeller above the top members. This protects the operator from the propeller airblast. Also, air traveling from the air channels to the rear vanes forms air curtains on each side of the operator to protect him from spray, dust, etc.

A steering wheel 22 is mounted on a panel 23 attached to the sidewalls 18, 18' of the inner channel member, and a seat 24 is provided for the operator. A rail 28 may be provided in front of the operator's position and a hand throttle 29 is mounted thereon.

The body platform 10 is provided with a downwardly extending peripheral wall or skirt 31 which forms an open plenum chamber 32 beneath the vehicle. Air from the lower portion of the propeller 11 is admitted to the plenum chamber 32 through a slotlike opening 33 in the body platform 10. Fixed curved vanes 34 are mounted in the lower portion of the opening to direct a portion of the air to the forward part of plenum chamber 32, so as to approximately equalize the air pressure in various parts of the plenum chamber.

Provision may be made for an operator to control separately the front and rear steering vanes. However, as here shown, the front and rear steering vanes are controlled simultaneously by steering wheel 22 through a cable 35 leading to the front steering vanes, and a cable 36 leading to the rear steering vanes. The linkage is such that the front and rear steering vanes turn in opposite directions in making a turn. Advantageously means are provided for permitting the relative orientation of the front and rear vanes to be changed at will, so as to take care of cross winds, sidehills, etc. Such means are described in detail in the aforesaid application Ser. No. 2,810.

The air channels 20, 20' are spaced downstream of the front steering vanes 14 and the space therebetween opens laterally to the ambient air. Thus, as the front steering vanes are turned in one direction or the other from there center position, a portion of the downstream flow of air from the propeller is directed to the ambient air laterally outside the air channels, and provides a front steering force. Depending on the detailed design, at small steering angles air may or may not be directed outside the air channels, since the rear steering vanes may provide sufficient control. However, for at least larger angles, a substantial portion of the air will be directed outside the air channels.

The front joining section 18" of the inner walls of the air channels is spaced sufficiently rearwardly of the front steering vanes 14 so that, as the vanes are angled to turn the vehicle, the downstream flow of air directed toward the air channel on the inside of a turn is reduced while flow of air directed toward the air channel on the outside of a turn is maintained. This assists in obtaining effective steering control at the rear of the vehicle.

In accordance with the present invention, air-blocking means are provided in the path of the downstream flow of air through the air channels to the rear steering vanes for substantially blocking passage of air thereby. In the specific embodiment here shown, sets of vanes 41, 41' are rotatably mounted in respective air channels 20, 20'. The vanes are mounted for rotation about respective axes 42 which are generally horizontal and extend laterally across the respective channels between the sidewalls 18, 19 and 18', 19' thereof.

Figure 5:
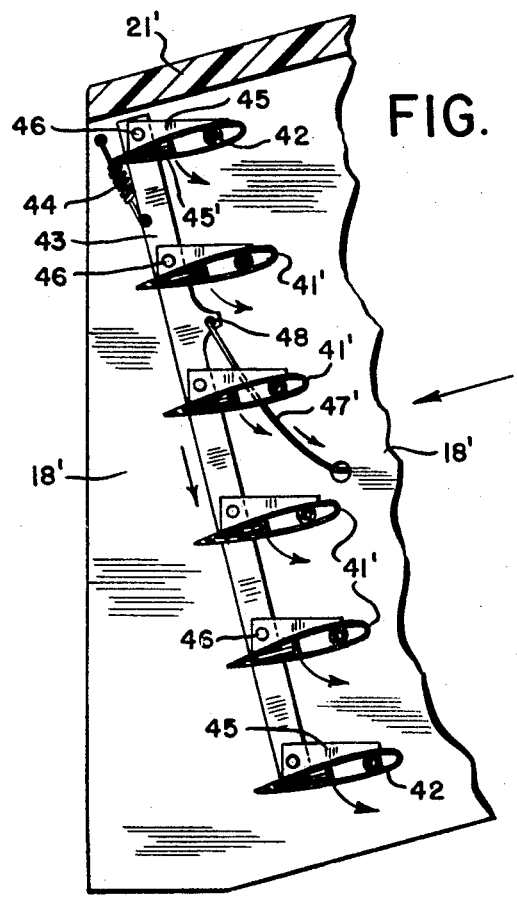
FIGS. 5 and 6 show the air-blocking vanes in open and closed positions, respectively.
Figure 6:
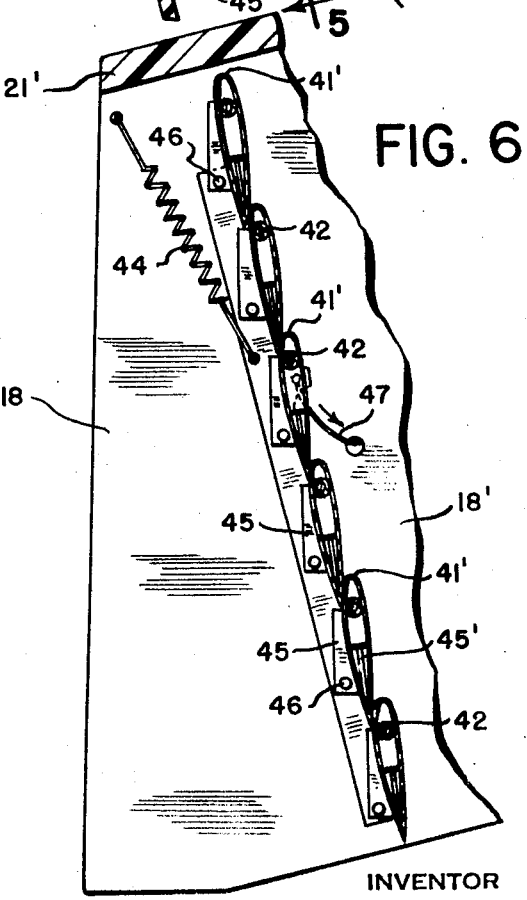

As illustrated in FIGS. 5 and 6, the vanes in a given set are connected by a tie bar 43 for simultaneous actuation. The tie bar is biased upwardly by spring 44 so that the air-blocking vanes normally are in their horizontal position. The vanes are molded of suitable plastic, leaving portions of them hollow to reduce weight. In order to control the orientation of the vanes, each vane has a metal turning piece 45. As specifically shown, the piece 45 is arranged to rotate on axis 42, and has a tab portion 45' which slips into a hollow region of the vane. Pieces 45 are pivoted to tie bar 43 at points 46.

Figure 4:
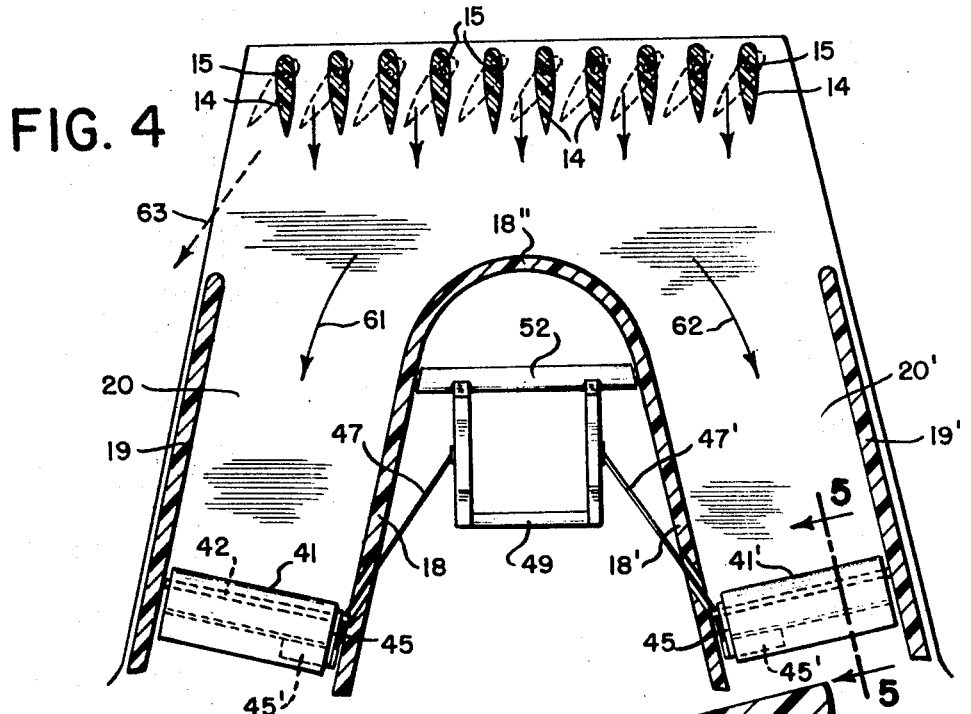
FIG. 4 is a horizontal cross section through the air channels showing the positions of the air-blocking vanes.

Control cables 47, 47' are attached at one end to the respective tie rod, as indicated at 48 in FIG. 5 The cables extend through respective holes in the corresponding inner walls 18, 18' of the air channels and are attached at the other end to a treadle 49 FIGS. 3 and 4). The treadle is pivotally mounted to rotate about an axis 51. Conveniently, the treadle is affixed to a tube 52 which rotates about an inner rod affixed to the walls, By applying foot pressure to move the treadle in the direction shown by arrow 53 (FIG. 3), the cables pull down on respective tie rods 43 and move the sets of vanes from the open position shown in FIG. 5 to the closed position shown in FIG. 6.

The vanes are advantageously streamlined so that, in the open position of FIG. 5, they do not offer appreciable resistance to flow of air through the channels. However, when moved to the closed position shown in FIG. 6, airflow through the respective channel is substantially blocked, There, of course, will be leakage of air around the vanes in the closed position, but this can be kept to a sufficiently small value.

Figure 8:
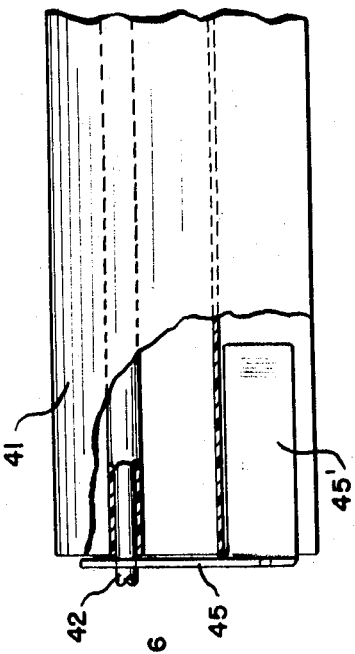
FIGS. 7 and 8 show details of the mounting of the air-blocking vanes.
Figure 7:
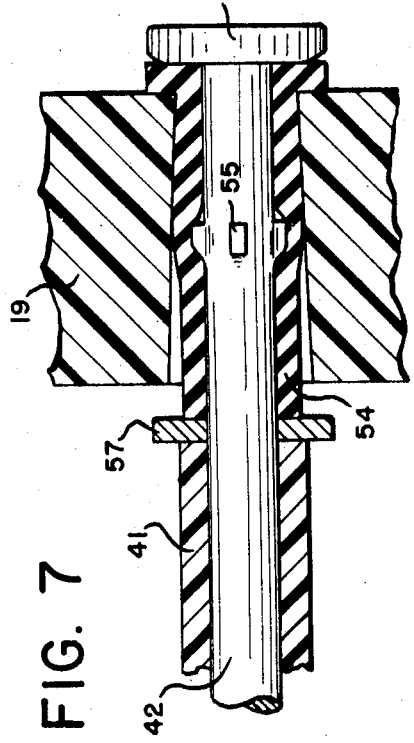

The vanes 41, 41' can be rotatably mounted an any desired manner. FIG. 7 shows one way. The inner end of shaft 42 passes into a hole in the inner wall of a channel, and the outer end is fixedly secured in the outer wall 19 of the channel. A plastic insert 54 in a hole in wall 19 is deformed by projections 55 on the shaft so that it fits tightly in the hole. The shaft has a head 56 which is pressed tightly against the insert during the inserting operation. Vane 41 turns freely on shaft 42, and is controlled through the metal piece 45 (FIG. 8) as already described. Washer 57 reduces friction between the vane and the insert 54.

Considering now the performance of the vehicle, with the front steering vanes 14 oriented fore and aft as shown in FIG. 4, and the rear steering vanes 16 likewise oriented fore and aft, the vehicle will travel in the forward direction. If there is a crosswind, or if the vehicle is traveling along the side of a hill, the front and rear steering vanes may be turned in the same direction to prevent sideslip, as described in the aforesaid application Ser. No. 2,810. Airflow through the front steering vanes 14 will divide approximately equally between the two channels 20, 20' as indicated by arrows 61, 62.

If it is desired to make a right turn, the front steering vanes 14 are turned to the dotted position shown in FIG. 4, and a portion of the air from the propeller is directed laterally outside the air channels to the ambient air, as indicated by dotted arrow 63. This forces the front of the vehicle toward the right. At the same time the rear steering vanes 16 are turned to the opposite angle so the the rear of the vehicle has a steering force toward the left. The net result is to turn the vehicle about a turning point somewhere between the front and rear steering vanes. Under these conditions the volume of air passing through channel 20' on the inside of the turn will be reduced, but adequate steering control by the rear vanes is assured by the continued flow of air through channel 20 on the outside of the turn.

If, now, the air-blocking vanes 41, 41' are turned to their closed position, as illustrated in FIG. 6, downstream flow of air through the air channels 20, 20' is substantially cut off. If the vehicle is traveling in the forward direction, with front and rear steering vanes fore and aft, the blocking of the air channels eliminates most of the forward thrust. There may still be some residual propulsion force due to leakage of air through the channels and due to rearward flow of air beneath the vehicle. For example, in one embodiment wherein the forward thrust, with the channels open as indicated in FIG. 5, was 90 pounds, the forward thrust was reduced to approximately 18 pounds with the vanes turned to the blocking position shown in FIG. 6. If the vehicle is initially at a standstill, with the air-blocking vanes cutting off flow through the air channels, the residual force is insufficient to move the vehicle, or at least any forward movement is very slight. On the other hand, if the vehicle is moving at high speed, the reduced thrust allows the vehicle to coast to a stop, against air resistance, etc.

With the air-blocking vanes in their closed position, airflow to the rear steering vanes is cut off so that they are no longer effective. However, it is found that steering control by the front steering vanes is still fully effective and indeed enhanced. For example, in one test wherein a steering force to the right (or left) of approximately 35 pounds was produced with the air-blocking vanes in their open position, the steering force increased to about 50 pounds with the vanes in their closed position. This is believed to be due to the spilling of air outside the channel which is on the outside of the turn. For example, with a hard right turn the airflow directed toward channel 20' on the inside of the turn is reduced to a small or negligible amount, whereas airflow directed toward channel 20 on the outside of the turn is substantially unimpaired. However, since channel 20 is blocked, air spills outwardly past the front of the outer wall 19. This increases the side thrust at the front of the vehicle and hence increases the turning effectiveness. Stated otherwise, with the air channels blocked, practically all the downstream flow of air from the propeller can be directed laterally outward to the ambient air to produce front steering. Consequently, with the air-blocking vanes closed, the operator retains excellent steering control in order to maneuver the vehicle.

It is preferred to locate the air-blocking vanes near the rear of the air channels, as illustrated in the specific embodiment. However, with the vane axes horizontal, they can be placed near the front of the channels, or in the middle of the channels, if desired, without markedly affecting their operation. Although they might be placed slightly ahead of the channels and still function to substantially block airflow through the channels, this is not preferred since there would then be some effect on the steering. It is possible to place the air-blocking vanes somewhat to the rear of the air channels, between the channels and the rear steering vanes. However, with such positioning the closed area of the vanes would need to be markedly increased in order to reduce the forward thrust to an acceptable value. Also, there is an adverse effect on the steering, since air spilling outside of the blocking area would produce a steering force at least partially counteracting the front steering force.

It is possible to arrange the air-blocking vanes to rotate about generally vertical axes. With the vanes located toward the front of the air channels, satisfactory results may be obtained. However, as the vanes are positioned more and more toward the rear of the channels, steering may be adversely affected when the vanes are only partially closed. Thus, consider that they are at the rear of the channels as illustrated in FIG. 4, but rotate about vertical axes. If the vanes were turned outwards, and were partially open, a steering force would be produced which would at least partially counteract that due to the front steering vanes when making a turn. If the vanes were turned inwards in closing, the air passing thereby would be directed at the operator, which would be quite uncomfortable.

By contrast, with the vanes rotating about horizontal axes and turning downwards as in the specific embodiment shown, air passing thereby in a partly closed position is directed downward towards the deck of the vehicle and then rearward to the rear steering vanes. Consequently the rear steering remains effective, although with reduced force.

When the air-blocking vanes are closed, as in FIG. 6, it is found that the front end of the vehicle tends to lift somewhat higher off the supporting surface. This is desirable so as to avoid any tendency of the bow to plow into the surface. It is believed that this is the result of the increase in back pressure behind the propeller, and possible flow of air around the outside of the shroud 13 to the propeller, which increases the velocity of the downstream flow of air, particularly at the propeller tips, With the fixed curved vanes 34 (FIG. 3) located in the lower portion of opening 33 through which a portion of the air from the propeller is directed beneath the vehicle to form the air cushion, the airflow from the propeller tips is directed to the forward part of the vehicle. Thus the increased air velocity from the propeller tips increases the proportion of air directed forwards beneath the vehicle, and raises the front thereof.

As will be apparent from the foregoing, the present invention allows the forward thrust to be reduced by any desired amount down to a low value, with full engine power applied, while preserving good steering control at all times. Sets of rotatable vanes for blocking airflow thereby are relatively simple and highly effective. However, other air-blocking means could be employed if desired.

I claim:

1. An air cushion vehicle which comprises
   a. a body,
   b. means for propelling and supporting said vehicle on an air cushion including air propelling means mounted toward the forward end of said body and adapted to produce a downstream flow of air in the rearward direction of the vehicle,
   c. front steering means for changing the direction of said downstream flow of air to lateral angles on either side of the vehicle,
   d. rear steering means positioned toward the rear of the vehicle on each side thereof and adapted to divert downstream flow of air supplied thereto to lateral angles on either side of the vehicle,
   e. air-channeling means spaced downstream of said front steering means for receiving portions of said downstream flow of air under the control of said front steering means and directing the flow of air therethrough to said rear steering means,
   f. the space between said front steering means and said air-channeling means opening laterally to the ambient air whereby for at least larger front steering angles a substantial portion of the downstream flow of air is directed to the ambient air laterally outside the air-channeling means,
   g. controllable air-blocking means in the path of the downstream flow of air through said air-channeling means to said rear steering means for substantially blocking passage of air thereby,
   h. and means for controlling said air-blocking means between unblocking and blocking conditions thereof.

2. An air-cushion vehicle in accordance with claim 1 in which said means for propelling and supporting the vehicle includes means for directing a portion of the air from said air propelling means to the space beneath said body to produce said air cushion.

3. A vehicle in accordance with claim 1 in which said air-channeling means includes a pair of laterally spaced air channels for directing downstream flow of air therethrough to respective sides of the rear steering means, the spacing of said air channels and said front steering means being correlated so that for at least a substantial portion of the front steering range the downstream flow of air directed toward the air channel on the inside of a turn is reduced while flow of air directed toward the air channel on the outside of a turn is maintained.

4. An air cushion vehicle in accordance with claim 3 in which said controllable air-blocking means is mounted in said air channels for controllably blocking and unblocking passage of air therethrough.

5. An air cushion vehicle which comprises
   a. a body,
   b. mans for propelling and supporting said vehicle on an air cushion including air propeller means mounted on said body toward the forward end thereof for producing a propelling downstream flow of air in the rearward direction thereof, c. upwardly extending front steering vanes mounted in the downstream flow of air near said propeller means,
d. upwardly extending rear steering vanes mounted near the rear of the vehicle on each side thereof,
e. steering means for turning said front and rear steering vanes to change the direction of airflow therefrom to respective lateral angles on either side of the vehicle,
f. air-channeling means mounted on said body between said front and rear steering vanes having upwardly and rearwardly extending inner laterally spaced walls with a front joining section, and upwardly and rearwardly extending outer walls laterally spaced from respective inner walls, said walls forming open-ended laterally spaced air channels for receiving portions of said downstream flow of air under the control of the front steering vanes and directing the flow of air therethrough to the rear steering vanes on the respective sides of the vehicle,
g. said air channels being spaced downstream of said front steering vanes to leave a space therebetween opening laterally to the ambient air whereby for at least larger front steering angles a substantial portion of the downstream flow of air is directed to the ambient air laterally outside the air channels,
h. and controllable air-blocking means in said leterally spaced air channels for substantially reducing airflow therethrough.

6. An air cushion vehicle in accordance with claim 5 in which said means for propelling and supporting the vehicle includes means for directing a portion of the air from said air propeller means to the space beneath said body to produce said air cushion.

7. An air cushion vehicle in accordance with claim 5 in which said air-blocking means includes a set of canes in each of said laterally spaced air channels rotatable between open and closed conditions. each set of vanes in the closed condition thereof extending across the respective channel to substantially block airflow therethrough, and means for rotating said vanes between open and closed positions thereof.

8. An air cushion vehicle in accordance with claim 5 in which said controllable air-blocking means is adapted to substantially block airflow through said laterally spaced air channels, and means for controlling said air-blocking means between unblocking and blocking conditions thereof.

9. An air cushion vehicle in accordance with claim 8 in which said means for propelling and supporting said vehicle includes means for directing a portion of the air from said air propeller means to the space beneath said body to produce said air cushion and including an opening in said body behind the lower portion of said air propeller means, and vane means in the lower portion of said opening for directing air to the forward part of said space beneath the body.

10. An air cushion vehicle in accordance with claim 5 in which the spacing of said front joining section from the front steering vanes is predetermined so that for at least a substantial portion of the front steering range the downstream flow of air directed toward the air channel on the inside of a turn is reduced while flow of air directed toward the air channel on the outside of a turn is maintained.

11. An air cushion vehicle in accordance with claim 10, in which said air-blocking means includes a set of vanes in each of said laterally spaced air channels mounted for rotation between open and closed positions about respective axes which are generally horizontal and extend laterally across the respective channel, each set of vanes in the closed condition thereof extending across the respective channel to substantially block airflow therethrough, and means for rotating said vanes between open and closed positions thereof.

12. An air cushion vehicle in accordance with claim 11 in which said vanes are mounted near the rear of the respective channels.

13. An air cushion vehicle in accordance with claim 11 in which said means for propelling and supporting the vehicle includes means for directing a portion of the air from said air propeller means to the space beneath said body to produce said air cushion.

14. An air cushion vehicle in accordance with claim 11 in which said means for propelling and supporting said vehicle includes means for directing a portion of the air from said air propeller means to the space beneath said body to produce said air cushion and including an opening in said body behind the lower portion of said air propeller means, and vane means in the lower portion of said opening for directing air to the forward part of said space beneath the body.

15. An air cushion vehicle which comprises
a. a body,
b. means for propelling and supporting said vehicle on an air cushion including air propelling means mounted toward the forward end of said body and adapted to produce a downstream flow of air in the rearward direction of the vehicle,
c. front steering means for changing the direction of said downstream flow of air to lateral angles on either side of the vehicle,
d. rear steering means positioned toward the rear of the vehicle on each side thereof and adapted to divert downstream flow of air supplied thereto to lateral angles on either side of the vehicle.,
e. a pair of laterally spaced air channels positioned rearward s of said front steering means for receiving portions of said downstream flow of air under the control of said front steering means and directing the flow of air therethrough to said rear steering means,
f. the space between said front steering means and said air channels opening laterally to the ambient air,
g. the rearward position and lateral spacing of said air channels being predetermined so that, over a substantial portion of the steering range of the front steering means, an increasing lateral angle of the downstream flow of air from the front steering means on either side of the vehicle produces an increasing airflow laterally outside the air channel on the respective side and a decreasing airflow to the air channel on the other side while maintaining airflow to the air channel on said respective side.
h. controllable air-blocking means in the paths of the downstream flow of air from said front steering means through said air channels to said rear steering means,
i. and means for controlling said air-blocking means between unblocking and blocking conditions thereof.

16. An air cushion vehicle in accordance with claim 15 in which said controllable air-blocking means is mounted in said air channels.